United States Patent [19]
Killpatrick

[11] Patent Number: 5,329,355
[45] Date of Patent: Jul. 12, 1994

[54] DITHER STRIPPER TO LEAVE BASE MOTION

[75] Inventor: Joseph E. Killpatrick, Minneapolis, Minn.

[73] Assignee: Honeywell Inc., Minneapolis, Minn.

[21] Appl. No.: 803,849

[22] Filed: Dec. 9, 1991

[51] Int. Cl.⁵ .................................... H01L 41/08
[52] U.S. Cl. .................................... 356/350
[58] Field of Search .................................... 356/350

[56] References Cited

U.S. PATENT DOCUMENTS

| 3,373,650 | 3/1968 | Killpatrick | 88/14 |
|---|---|---|---|
| 3,627,425 | 12/1971 | Doyle et al. | 356/106 |
| 4,248,534 | 2/1981 | Elbert | 356/350 |
| 4,344,706 | 8/1982 | Ljung et al. | 356/350 |
| 4,411,527 | 10/1983 | Gamertsfelder et al. | 356/350 |
| 4,445,779 | 5/1984 | Johnson | 356/350 |
| 4,597,667 | 7/1986 | Curby et al. | 356/350 |
| 4,610,543 | 9/1986 | Ferriss | 356/350 |
| 4,790,658 | 12/1988 | Sewell | 356/350 |
| 4,802,766 | 2/1989 | Lundeen et al. | 356/350 |
| 4,826,320 | 5/1989 | Callaghan et al. | 356/350 |
| 4,987,334 | 1/1991 | Jungwirth | 356/350 X |

Primary Examiner—Mark Hellner
Attorney, Agent, or Firm—Robert A. Pajak

[57] ABSTRACT

Readout signals of a dithered ring laser inertial integrating rate sensor are processed by a signal combining circuit which forms part of a closed loop scheme for removing the dither signal other than the base motion component thereof. The output of the signal combining circuit has a computed base motion component removed therefrom by a second signal combining circuit. The output of the second signal combining circuit is used to control a correction signal that is subtracted from the gyro output signal by the first signal combining means. The correction signal is multiplied by a ratio of the rotational inertia of the sensor over the sum of the rotational inertia of the sensor and the rotational inertia of the base to obtain the computed base motion component of the dither signal.

16 Claims, 4 Drawing Sheets

DITHER STRIPPER TO LEAVE BASE MOTION

BACKGROUND OF THE INVENTION

This invention relates to laser inertial integrating rate sensors and, more specifically, to sensors in which a dither bias is used to obviate the effects of lock-in inherent in such sensors.

The behavior of ring laser inertial integrating rate sensors is well understood by those skilled in the art. Inherent in such sensors is the phenomenon known as "lock-in" in which counter propagating laser beams tend to lock together to a common frequency. Lock-in arises in ring laser inertial integrating rate sensors at low rates of rotation. At such low rates of rotation, the frequency differential between the two beams is relatively small and the beams tend to couple or resonate together so that the two beams oscillate at only one frequency. Because of this lock-in phenomenon, the frequency differential is no longer proportional to the rate of angular rotation, causing performance errors which have deleterious effects in navigation systems.

To avoid or reduce the effects of lock-in, the laser inertial integrating rate sensor may be biased by dither techniques such as those shown and described in U.S. Pat. No. 3,373,650 to J. E. Killpatrick, assigned to the assignee of the present invention and incorporated herein by reference. The biasing technique usually referred to as dithering may be implemented, typically using mechanical schemes, in a variety of ways. Since these biasing techniques directly affect the behavior of the counter propagating laser beams, the sensor output signal contains not only rate information signals due to inertial motion but also contains a signal component related to the biasing of the sensor. This is true whether the output signal generator is mounted directly on the sensor (block mounted) or off the sensor (case mounted).

The sensor output signal dither contribution further includes a base motion component due to dithering, herein referred to as "$\theta_B$," and a sensor or gyro motion component due to dithering, herein referred to as "$\theta_G$." The sensor motor component of the dither signal represents the reaction of the sensor to the torque applied by a motive means attached to the base on which the sensor is mounted. The base motion component of the dither signal represents the motion of the base on which the sensor is mounted which results from a reaction torque from the motor means mounted to the base. This torque acting on the base is of equal magnitude but in a direction opposite the direction of a dither torque applied to produce the dither motion in the sensor. The torque acting on the base produces the base motion that is synchronous with the dither motion of the sensor and is opposite in direction.

Frequently, more than one inertial integrating rate sensor is mounted to an object for providing rotational information about the object. Sometimes only one or two inertial integrating rate sensors are mounted to the object as a means for providing angular rotation information to a system. For example, inertial integrating rate sensors may be used to provide rotational information for an optical telescope having one or more axes of rotation. This rotational information is provided to a control system that is capable of selectively activating servo motors to reposition the telescope thus insuring the telescope remains pointed at a selected target.

If dithered inertial integrating rate sensors are used, then the control system is provided rotational information from one or more sensors that are attached to a base which is in turn shock mounted to the telescope. Dithering the inertial integrating rate sensor causes the sensor to react against the base producing base motion. Because the base is moving relative to the telescope, due to dithering, the control system receives rotational information about the telescope that is in error by the amount of base motion due to dithering. Therefore, the control system is not able to maintain a pointing accuracy that is less than the angular rotation of the base due to dither.

If, however, the base motion due to dithering could be determined and supplied to the control system then the error due to base motion can be subtracted from the rotational information. The control system would then be capable of determining the actual angular movement of the telescope. Once the actual angular movement of the telescope are determined by the control system then it is possible for the control system to correct or adjust for angular movements of the telescope that are smaller than angular movements of the base due to dithering.

Thus, there is a need in these circumstances for a means for accurately determining the base motion due to dither. It is necessary that this base motion determining means maintain accuracy during aging and environmental effects such as temperature variation.

Inertial navigation systems usually make use of three or more integrating rate gyros or sensors attached to the same base. Typically, three such inertial integrating rate sensors are coupled to the base having an orientation such that the axes of sensitivity of the inertial integrating rate sensors are substantially mutually orthogonal to one another, as seen in FIG. 1. The sensor configuration shown in FIG. 1 includes a mounting base, 9, having three inertial integrating rate sensors, 10A, 10B, and 10C, attached thereto. Isolation mounts (not shown) tend to prevent the transfer of vibration between the mounting base 9 and the case (not shown) on which it is mounted. Each inertial integrating rate sensor 10A, 10B and 10C produces an output signal that is indicative of the sum total of all the instantaneous angular motion changes the sensor has undergone in its input axis, or axis of sensitivity. The inertial navigation system transforms the sum of all instantaneous angular motions produced by each inertial integrating rate sensor into navigation parameters.

The use of mechanically dithered inertial integrating rate sensors in these navigation systems results in base motion due to the base motion components, $\theta_B$, of each individual inertial integrating rate sensor. As shown in FIG. 1, the base motion component, $\theta_B$, of sensor 10A produces a resultant motion of sensor 10C in a plane substantially orthogonal to the axis of sensitivity of sensor 10C. In a similar manner, the base motion component, $\theta_B$, of sensor 10B produces a resultant motion of sensor 10C in a plane substantially orthogonal to the axis of sensitivity of sensor 10C. Similarly, the base motion components of sensors 10A and 10C each produce a resultant motion of sensor 10B, and the base motion components of sensors 10B and 10C each produce a resultant motion of sensor 10A.

This resultant motion of each of the inertial integrating rate sensors due to the base motion components of each of the other two inertial integrating rate sensors is such that a point in a plane substantially orthogonal to its sensitive axis follows a Lissajous figure. The Lissajous figure produced for one sensor may be a straight line, ellipse or circle depending on the dither phases of each of the other two inertial integrating rate sensors, assuming each is dithered at the same rate. The axis of rotation, or input or sensitive axis, of this third inertial integrating rate sensor more or less follows a cone due to such motion of the base, and so such input motion is generally referred to as "coning." This axis cone motion represents a real input rate to the third gyro in addition to any inertial rotation about this axis and its dither reaction and, if not made insignificant or corrected for, is an error term in the inertial output signal.

The Lissajous figure for one sensor is the result of base motion components in each of two perpendicular axes due to the other sensors. These base motion components are represented by the angular displacement of sensor 10C due to sensor 10A and 10B dither motion, as seen in FIG. 1. The angular displacement of sensor 10C due to sensor 10A dithering can be represented by the following equation:

$$\theta_{C-A} = A_A \sin \Omega t \qquad (1)$$

In equation 1, $A_A$ represents the amplitude of the base motion or oscillations due to sensor 10A dithering. The term $\Omega$ represents the frequency of the base motion due to sensor 10A dither. The angular displacement of sensor 10C due to sensor 10B dithering can be represented by the following equation:

$$\theta_{C-B} = A_B \sin (\Omega t + \xi) \qquad (2)$$

In equation 2, $A_B$ represents the amplitude of the base motion due to sensor 10B dithering. The term $\Omega$ represents the frequency of the base motion due to sensor 10B dither. The term $\xi$ represents the phase shift between the dithering of sensor 10A and the dithering of sensor 10B.

If the motions represented by equations 1 and 2 are assumed, then through standard mathematical translation a known mathematical representation for the mean angular rate sensed by sensor 10C can be derived. The mean angular rate that sensor 10C senses in an axis of sensitivity orthogonal to the axis of sensitivity of both sensors 10A and 10B is represented by the following equation:

$$\omega_c = \frac{A_A \cdot A_B}{2} \Omega \sin \xi$$

In equation 3, the mean angular rate sensed by sensor 10C as a result of the dither motions of sensors 10A and 10B represents the coning error in the sensor 10C output signal. This coning error is constant with respect to time as long as both the phase shift and frequency of the base motion $\Omega$ are constant. The larger of terms $A_A$ and $A_B$ represents the major axis and the smaller term represents the minor axis of an ellipsoid Lissajous figure. If the dither motions produced by sensor 10A and sensor 10B are in phase, the term $\xi$ is zero and the coning error rate is zero.

If, alternatively, two orthogonally oriented gyros have different dither frequencies, the Lissajous figure in the plane of a third gyro is not constant but goes through both positive and negative phase relations. The volume swept out by the input axis of this third gyro tends to be zero because the area swept out when the phase is positive is cancelled out by the area swept out when the phase is negative. An instantaneous coning or input error exists, but this error does not build up over time. Therefore by running the gyros at different frequencies this coning error is greatly reduced, but not eliminated.

Another technique for reducing coning error has been to make the mass of the base very large relative to the mass of the sensor mounted thereon. In this manner, the base motion due to dither is reduced. The base motion due to dither, however, is not eliminated.

The device base motion due to dither cannot readily be determined precisely from the dither pickoff signal provided by the piezoelectric output device because of the wide variation of the device output due to aging, temperature, and various environmental effects. Hence, here too, there is a need for a means for determining the motion of the base due to dithering. Once the motion of the base due to dithering is known, it can be provided to the remainder of the navigation system which can in turn correct for the error component in the sensor output signal that is due to this base motion.

In addition, the system can correct for any coning error that might be present in a sensor output signal if the actual base motion due to dithering is known. For sensors that are configured such that a coning error input is produced in one of the sensor outputs, the system can compute or determine this error from the base motion components due to dithering resulting from the two orthogonal sensors. Once the coning error that is produced by each sensor is computed, it can then be subtracted from the sensor output thereby eliminating coning errors from the inertial navigation system.

SUMMARY OF THE INVENTION

The present invention is an angular rotation sensing system for sensing rotational motion about a primary axis with respect to a base compliantly mountable to a supporting means. The angular rotation sensing system is capable of providing a sensing system output signal that is indicative of angular rotation.

An angular motion sensor is included that is capable of providing a sensor output signal indicative of angular rotation about a primary axis. The sensing system further includes an angular motion sensor mounting means for mounting the angular motion sensor to the base. The angular motion sensor mounting means has compliance so that the angular motion sensor can be rotationally oscillated.

An oscillation means is provided that is capable of producing a first torque acting on the angular motion sensor with respect to the base. Producing the first torque results in a second torque on the angular motion sensor acting in a direction opposite the first torque causing both the angular motion sensor and the base to rotationally oscillate.

The sensor output signal indicative of angular rotation has an inertial component due to any inertial rotation of the angular motion sensor about the primary axis. The sensor output signal also has an oscillation component due to the rotational oscillation of the angular motion sensor. The oscillation component further includes a base motion contribution and an angular motion sensor motion contribution.

An estimation means is included for providing an estimated value of the base motion contribution. A stripping means is included for determining the angular motion sensor contribution from both the oscillation component and the estimated value. The stripping means provides the sensing system output signal with the base motion contribution therein having removed the angular motion sensor motion contribution.

DETAILED DESCRIPTION OF THE PREFERRED EMBODIMENTS

Figure 2:
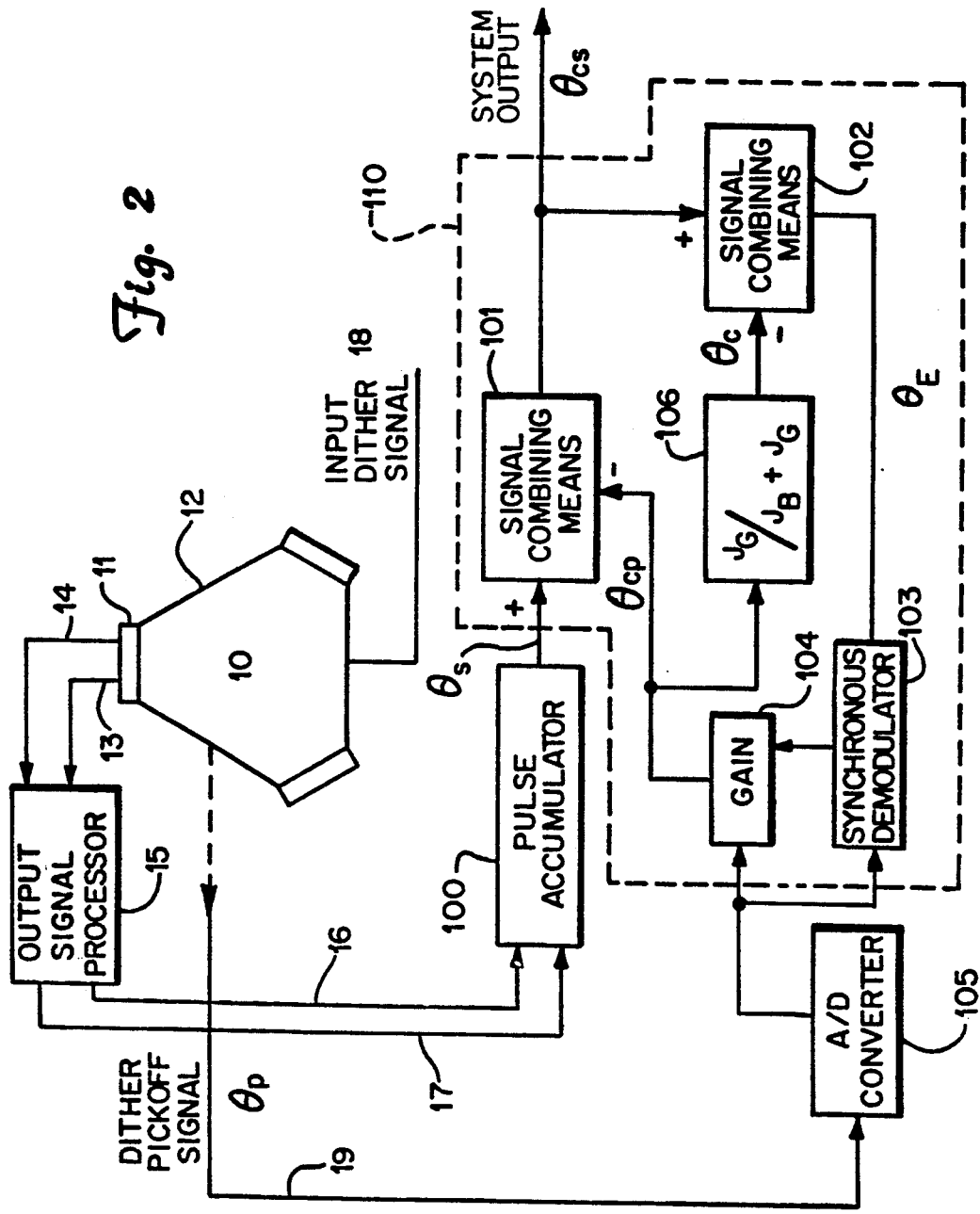
FIG. 2 is a system block diagram illustrating a closed loop system providing for removing dither signal components other than the base motion component from the ring laser output.

Referring to FIG. 2, there is shown a ring laser inertial integrating rate sensor, 10. Sensor 10 includes an output signal generator, 11, mounted to a block, 12. Block 12 provides the propagation path for counter-propagating laser beams. Sensor output signal generator 11 is responsive to a portion of counter-propagating laser beams and provides output signals, 13 and 14, representative of the frequency difference between the beams as will subsequently be described in further detail.

Output signal generator 11, as stated above, includes a means for combining a portion of each of the counter-propagating laser beams to generate an interference pattern representing the results of the interference therebetween. Output signal generator 11 usually includes two photodetectors responsive to different locations in the interference pattern for each providing one of a pair of sensor output signals 13 and 14 indicative of the intensity variation in the fringe pattern that impinges the detector. Angular rotation of the sensor 10 in either direction about an axis of sensitivity causes a frequency differential to occur between the laser beam frequencies, which differential is proportional to the rate of angular rotation. The fringe pattern represents the beat frequency of the heterodyned optical frequencies of the two beams. This fringe pattern consists of alternate light and dark bands of light that move one way or the other depending on the direction of rotation of the inertial integrating rate sensor 10. The photodetector output frequency, or rate of fringe movement, is proportional to the rate of rotation of the sensor 10.

Output signal generator 11 provides output signals 13 and 14 to an output signal processor, 15. Sensor output signals 13 and 14 are sinusoidal signals that each represent the intensity variations in the fringe pattern that impinges the respective detectors. Each detector is positioned a quarter wavelength apart so that output signals 13 and 14 will be sinusoidal signals 90° out of phase from each other. When sensor 10 rotates in one direction, one of the sensor output signals will lead the other by 90°. When sensor 10 is rotated in the opposite direction, the other sensor output signal will lead by 90°. In this manner, output signal processor 15 is capable of direction discrimination by determining which sensor output signal, 13 or 14, is leading the other by 90° of phase.

Output signal processor 15 provides output signals, 16 and 17, to a pulse accumulator, 100. To better understand the function of output signal processor 15, consider plotting the sinusoidal output signals 13 and 14 on an x-y axis. Output signal 13 is plotted on the x axis and output signal 14 is plotted on the y axis such that a circle is swept out. The output signal processor 15 digitally processes sinusoidal output signals 13 and 14 in a known manner to produce digital output signals 16 and 17. The direction of angular rotation of the inertial integrating rate sensor 10 is determined by the phase of output signals 13 and 14 represented by the direction in which the circle is swept out on the x-y axis. This direction of rotation of sensor 10 is represented by the sign of the digital output signals 16 and 17. In addition, the number of pulses present in output signals 16 and 17 represents the number of times the circle, or portions thereof, is swept out on the x-y axis.

Therefore, output signals 16 and 17 are a series of pulses which represent the instantaneous angular displacement of sensor 10 for a given direction. For example, logic level "1" pulses present in output signal 16 represent the instantaneous angular displacements of sensor 10 in a clockwise direction while logic level "1" pulses present in output signal 17 represent the instantaneous angular displacements of sensor 10 in the counter-clockwise direction.

Sensor 10 is also provided with an input dither signal, 18, operating a dithering mechanism to provide the dither or rotational motion bias as previously described. For example, block 12 may be rotationally oscillated for dithering purposes, as shown in U.S. Pat. No. 3,373,650. A dither spring having piezoelectric motion inducing devices attached thereto causes the spring to periodically flex resulting in block 12 rotationally oscillating. Furthermore, a piezoelectric motion sensing device may also be attached to the spring for providing an output signal, 19, identified as "$\theta$" that is directly related to the relative motion between the sensor 10 and the base 9. The just-mentioned piezo-electric output signal "$\theta$" is sometimes referred to as the "dither pickoff signal."

The dither pickoff signal is substantially a sinusoidal signal with phase and amplitude related to the total motion of sensor 10. The dither pickoff signal is measured such that it reflects the relative rotation of the sensor and the base. Because the directions of rotation for the sensor 10 and the base 9 due to dithering are opposite, or 180 degrees out of phase, the dither pickoff signal has peak amplitudes that are greater than either the sensor motion or the base motion due to dithering. The dither pickoff signal 19 may be obtained by other techniques depending on the dither scheme that is selected.

The mechanical biasing of the counter-propagating laser beams results in rotation motion that directly affects the number and rate of fringe changes passing the photodetector, and so directly affects output signals 16 and 17. Output signals 16 and 17, therefore, include both a dither induced signal component and an inertial rotation induced signal component.

Also shown in FIG. 2 is a closed loop system providing for the removal of the dither signal components that are not related to base motion from the sensor readout digital signal herein designated "$\theta_S$." A corrected output signal is provided by the closed loop system that is substantially equal to the base motion component $\theta_B$ due to dithering and the inertial rotation component. More specifically, the closed loop system removes a sensor motion component $\theta_G$ of the dither signal from the output signal while allowing a base motion component of the dither signal $\theta_B$ to remain therein.

Shown in FIG. 2 is a pulse accumulator 100 for integrating (counting) the series of pulses contained in the output signals 16 and 17 to produce an output signal $\theta_S$ indicative of the angular rotation of the sensor 10 at any instant. The output signal $\theta_S$ of pulse accumulator 100 is a digital signal provided to a signal combining means, 101. Output signal $\theta_S$ is a 16 bit digital word representing one of $2^{16}$ values, with hexadecimal values $0000_H$ representing the lowest cumulative angular rotation and $FFFF_H$ representing the greatest cumulative angular rotation. Signal combining means 101 combines a corrected pickoff signal identified by the $\theta_{CP}$, to be described below, and the sensor output signal $\theta_S$ provided by pulse accumulator 100.

The output signal from combining means 101 is defined as the corrected or "stripped" output signal and is herein designated as "$\theta_{CS}$." Signal $\theta_{CS}$ is the difference between the sensor output signal $\theta_S$ and the corrected pickoff signal $\theta_{CP}$, thereby providing a corrected sensor output signal omitting dither signal components unrelated to base motion. The signal combining means 101 performs essentially a subtraction function so as to subtract signal $\theta_{CP}$ from signal $\theta_S$.

The corrected output signal $\theta_{CS}$ provided by signal combining means 101 is presented to a second signal combining means, 102, which receives a second input signal $\theta_C$ to be described below. The signal $\theta_C$ represents a computed base motion sinusoidal signal, and has a magnitude and phase estimated representative of the base motion component of the corrected pickoff signal $\theta_{CP}$. Signal combining means 102 provides an output signal $\theta_E$ representative of the corrected output signal $\theta_{CS}$ omitting the computed base motion component $\theta_C$ of the dither signal. Signal combining means 102 performs essentially a subtraction function so as to subtract signal $\theta_C$ from signal $\theta_{CS}$.

The output signal $\theta_E$ from the second signal combining means 102 is presented to a synchronous demodulator, 103. The digital value of the dither pickoff signal is also provided to synchronous demodulator 103 by an analog-to-digital (A/D) converter, 105. Synchronous demodulator 103 produces an output signal that is representative of the of those components of its input signal, $\theta_E$, that are present in the digital representation of the dither pickoff signal. The synchronous demodulator 103 output signal therefore does not contain substantially any of the sensor motion component $\theta_G$. The output signal of synchronous demodulator 103 is a digitally encoded value ranging from zero to a maximum value, with zero representing that little or no dither signal components are present in the $\theta_E$ signal.

In addition to receiving the output signal from synchronous demodulator 103, a gain means, 104, also receives a second input signal, the digital value of the dither pickoff signal, from an A/D converter, 105. The gain means 104 produces an output signal $\theta_{CP}$, herein referred to as the corrected pickoff signal. Gain means 104 functions as a variable gain amplifier having a gain determined by the output signal of synchronous demodulator 103.

Because signal $\theta_E$ contains only dither signal components other than the base motion due to dithering $\theta_B$, the output signal from synchronous demodulator 103 represents the dither signal components other than the base motion component present in signal $\theta_E$. The dither pickoff signal $\theta_P$, represents the relative rotation between the sensor 10 and base 9, and has essentially the same phase and frequency as the dither signal component sensor output signal $\theta_S$. Then, by gain adjusting the dither pickoff signal, gain means 104 essentially reproduces the dither signal components other than the base motion component that are present in the sensor output signal $\theta_S$. Therefore, the corrected pickoff signal $\theta_{CP}$ has the same characteristics as the dither signal components, other than the base motion component, in the sensor output signal $\theta_S$. The corrected pickoff signal $\theta_{CP}$ provided by gain means 104 is presented to both the signal combining means 101 and a multiplying means, 106.

Multiplying means 106 essentially multiplies the input signal $\theta_{CP}$ by a scale factor representing the ratio of the rotational inertia of the rotational sensor (or gyro), $J_G$, to the sum of the rotational inertias of the sensor $J_G$ and the base $J_B$. Multiplying means 106 provides an output signal $\theta_C$ which represents an estimated value of the base motion component of the dither signal due to dithering based on the value of the sensor motion component represented by signal $\theta_{CP}$.

The multiplication or scaling performed by multiplication means 106 produces an estimation of the base motion component $\theta_B$ of the dither signal from the corrected pickoff signal $\theta_{CP}$ is the focus of this invention. This estimate of the base motion component due to dithering is a good one because any coning error components present in the sensor output signal $\theta_S$ will be rejected by the synchronous demodulator 103. Since any coning error component that may be present in the sensor output signal will not have the same phase as the dither pickoff signal $\theta_S$, it will not be passed by synchronous demodulator 103 and thus will not affect the gain of gain means 104. In closed loop operation, signal $\theta_{CP}$ continues to change until it is substantially equal to the dither signal components other than those due to base motion in the sensor output signal $\theta_S$.

The closed loop system of the present invention is preferably implemented with a processing means, 110. This processing means 110 performs each of the functions previously described for the first signal combining means 101, second signal combining means 102, synchronous demodulator 103, gain means 104, and multiplier means 106. Processing means 110 may be a microprocessor, digital computer, or some form of programmable logic device, all of which are well known. Processing means 110 periodically receives digital values from pulse accumulator 100 indicative of the angular rotation of sensor 10 at any instant. In addition, processing means 110 periodically receives a digital value representing the dither pickoff signal $\theta_P$. A digital value representing the base motion component of the dither signal $\theta_B$ is periodically produced by processor 110.

Figure 3:
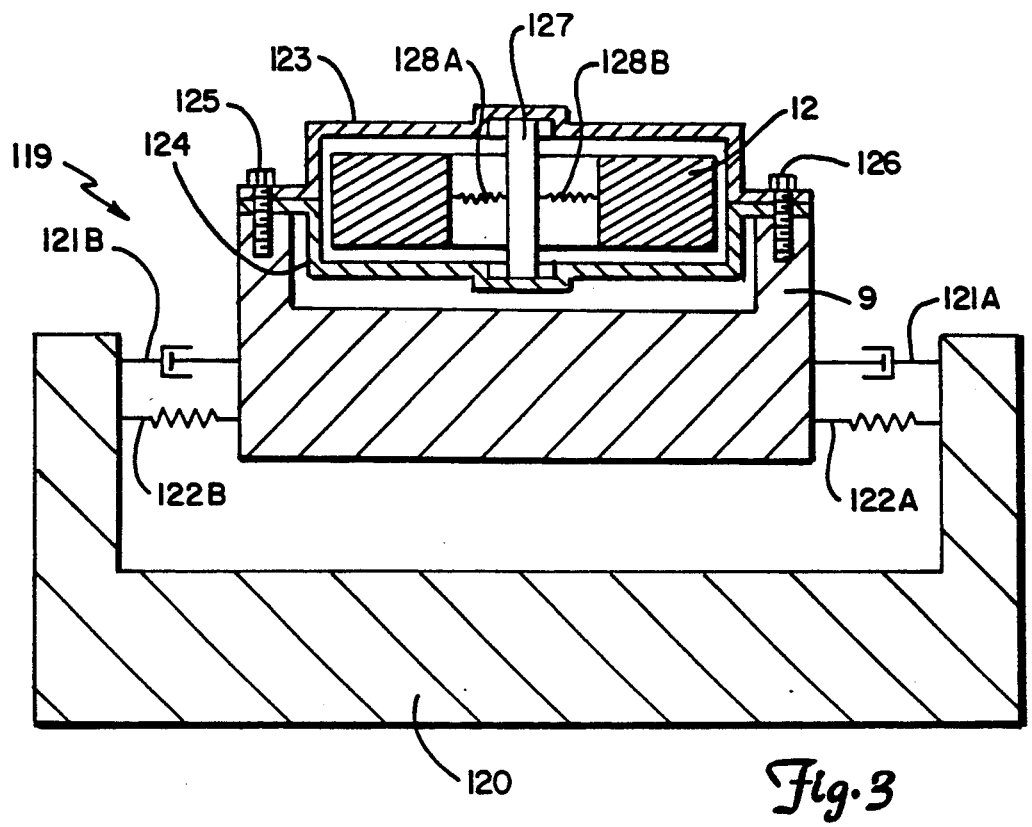
FIG. 3 is a diagrammatic sectional view of a dithered inertial integrating rate sensor assembly that is isolation mounted to a case.
Figure 4:
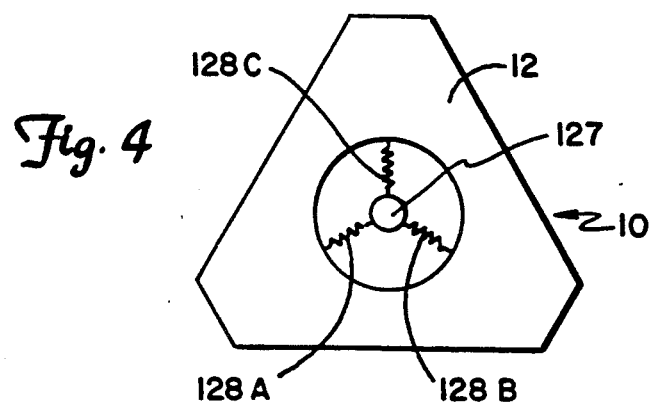
FIG. 4 is a top plan view of a sensor block in isolation which is spring mounted to a sensor block support pin.

FIGS. 3 and 4 illustrate the mechanical dithered inertial integrating rate sensor assembly, 119. Sensor assembly 119 includes a mounting base, 9, a case, 120 and one or more flexible, mechanical linkages, 121A, 121B, 122A, 122B, positioned therebetween. The flexible, mechanical linkages shown in FIG. 3 are represented by dashpots 121A and 121B and springs 122A and 122B. These flexible, mechanical linkages form an isolation or shock mount tending to prevent low frequency vibrations from the larger more massive case 120 from coupling through the flexible mechanical linkages to the base 9. In addition, these isolation mounts tend to prevent the high frequency dither motion of the base 9 from coupling through these flexible mechanical linkages to cause case 120 to vibrate. Isolation mounts represented by dashpot 121A and 121B and springs 122A and 122B are well known.

Sensor assembly 119 further includes sensor 10 positioned between an upper sensor block housing, 123, and a lower sensor block housing, 124. Fastening screws, 125 and 126, hold the upper sensor block housing 123 together with the lower sensor block housing 124 while at the same time attaching the upper and lower sensor block housings 123 and 124 rigidly to mounting base 9. A sensor block support pin, 127, is centrally located and extends between the upper sensor block housing 123 and the lower sensor block housing 124.

Sensor 10 further includes sensor block 12, the previously discussed output signal generator which is not shown and a dither motor assembly also not shown. Sensor block 12 is supported from the sensor block support pin 127 by three sensor block support springs, 128A, 128B and 128C. The dither motor assembly is located between the upper sensor block housing 123 and the lower sensor block housing 124 to provide a sinusoidal rotation input to the sensor block 12 for preventing the two counter rotating beams from tending to lock together.

Figure 1:
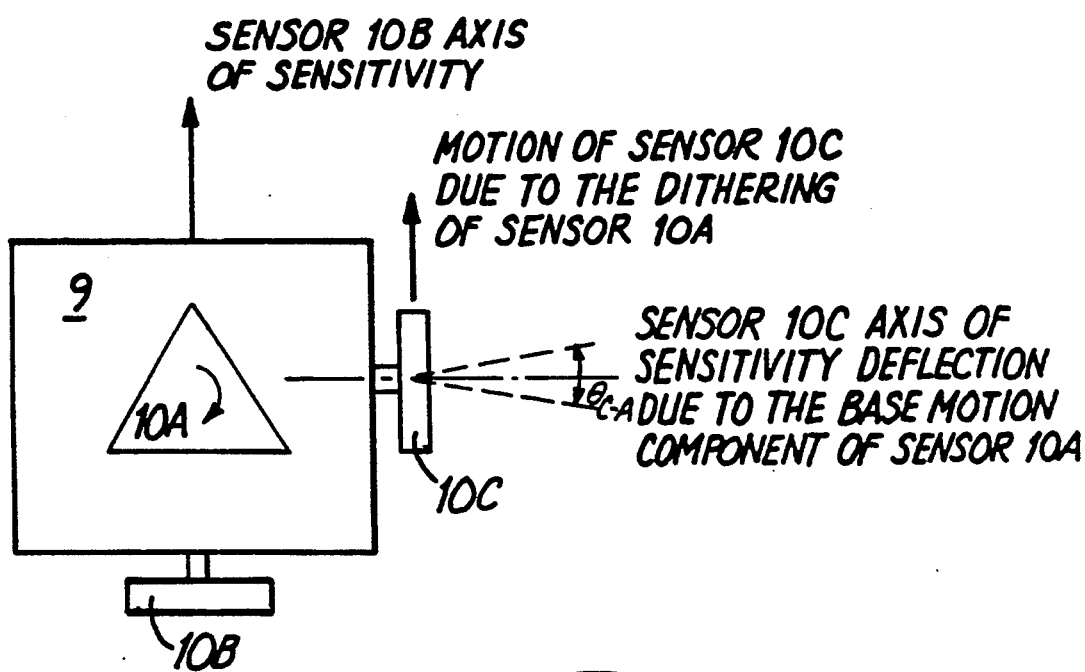
FIG. 1 is a front plan view of a mechanical representation of a mounting base having three inertial integrating rate sensors thereon.
Figure 5:
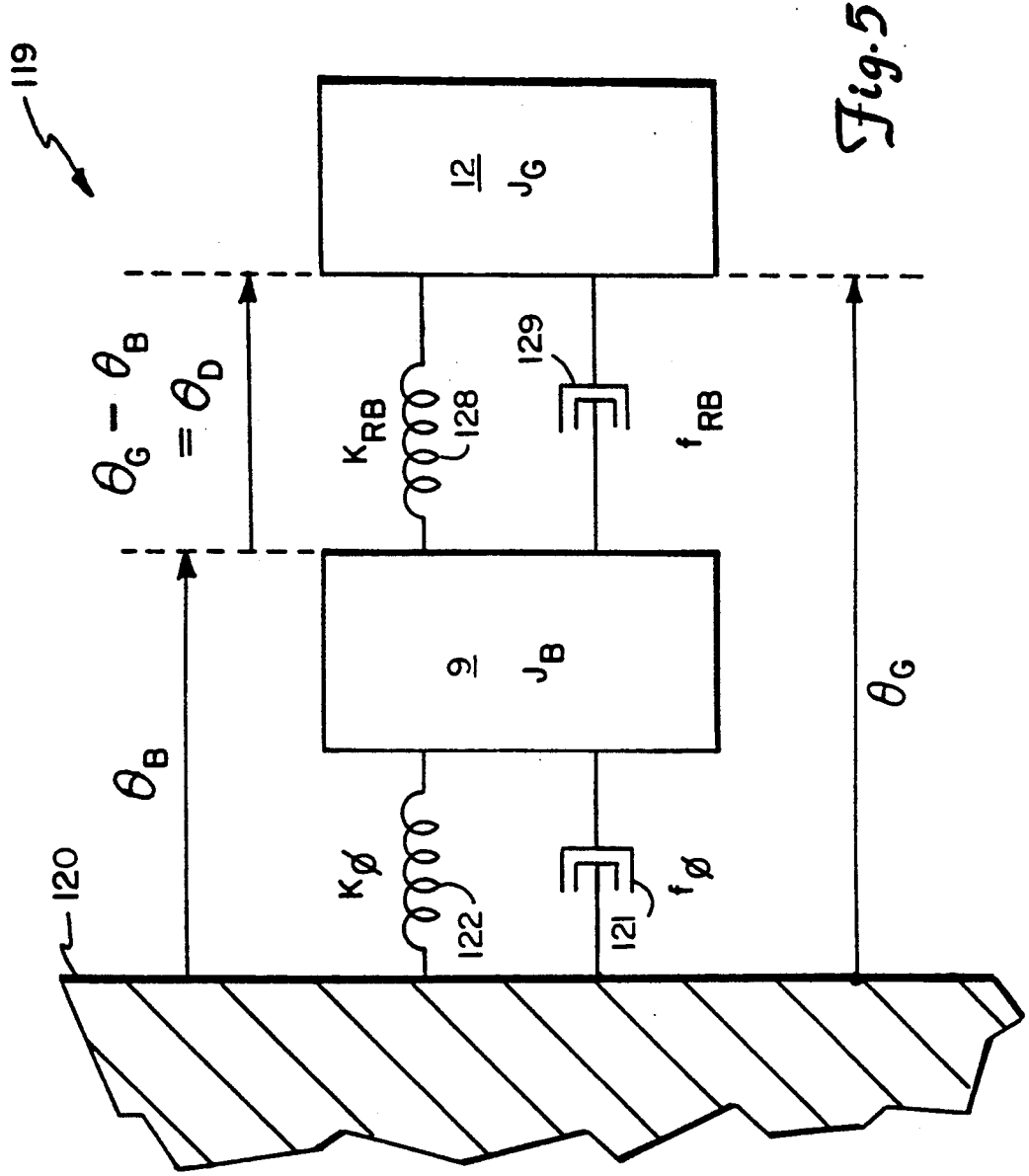
FIG. 5 illustrates a mechanical schematic representation of a dithered inertial integrating rate sensor assembly that is mounted to a base supported by an isolation mounting.

FIG. 5 illustrates a mechanical equivalent schematic representing the gyro assembly 119, shown in FIGS. 3 and 4. Shown there is the sensor block 12 attached to base, 9, by shock mount represented by a spring 128 and a dashpot, 129. Base 9, in turn is mounted using a shock mount represented by a dashpot 121 and a spring 122 to a case 120. The shock mounting 121A, 121B, 122A and 122B shown in FIG. 3 for base 9 is represented in FIG. 5 by a spring 122 having rotational stiffness $K_\phi$ and a rotational dashpot 121 having a friction $f_\phi$. In a typical inertial sensor assembly, there are three such sensor block assemblies each mounted to the same base 9 such that each sensor assembly has a mutually orthogonal axis of rotation as shown in FIG. 1.

The gyro assembly 119 can be analyzed as a free body for frequencies that are of an order of magnitude greater than the natural or resonant frequency of the low frequency case shock mount 121 and 122. For frequencies of an order of magnitude or more greater than the natural frequency of the shock mounts 121 and 122 for case 120, both spring stiffness $K_\phi$ and dashpot friction $f_\phi$ are zero.

The gyro assembly 119 can be modeled as a sensor block 12, having a rotational moment of inertia $J_G$ attached to a rotary spring 128 of rotational stiffness $K_{RB}$ to base 9, with moment of inertia $J_B$. Rotary spring 128 represents the sum of the rotational stiffness of springs 128A, 128B and 128C shown in FIG. 4. Dashpot 129 attached between sensor block 12 and base 9 represents the rotational stiffness $K_{RB}$ which predominantly arises from air resistance as the sensor block 12 rotates.

The absolute angular displacement of sensor block 12 is represented by $\theta_G$, and the absolute inertial angular displacement of base 9 is represented by $\theta_B$. The value $\theta_D$ represents the difference between the absolute inertial angular rotation between sensor block 12 and base 9. The torque acting on sensor block 12 and base 9 can be approximated by the following equation:

$$J_G\alpha_G + f_{RB}(\omega_G - \omega_B) + K_{RB}(\theta_G - \theta_B) = T \tag{4}$$

In this equation, $\alpha_G$ represents the angular acceleration of sensor block 12. The term $\omega_G$ represents the angular velocity of sensor block 12, and $\omega_B$ represents the angular velocity of base 9. The torque acting sensor block 12 is represented by $+T$ whereas the torque acting on base 9 is represented by $-T$. The terms $\theta_G - \theta_B$ and $\omega_G - \omega_B$ represent the spring restoring torque and the damping torque, respectively, that arises out of the difference between the sensor block 12 motion and the base 9 motion.

Summing the torques for base 9 for which both springs $K_\phi, K_{RB}$ and dampers $f_\phi, f_{RB}$ are attached can be represented by the following equation:

$$J_B\alpha_B + f_{RB}(\omega_B - \omega_G) + f_\phi\omega_B + K_{RB}(\theta_B - \theta_G) + K_\phi\theta_B = -T \tag{5}$$

Defining $\theta_G - \theta_B$ as equal to the dither angle, $\theta_D$, and adding equations 4 and 5 together, yields an expression free of T:

$$J_G\alpha_D + (J_B + J_G)\alpha_B + f_\phi\omega_B + K_\phi\theta_B = 0 \tag{6}$$

Assuming that there is some steady state dither and base motion, i.e. pure sinusoidal at steady amplitudes, and at some frequency $\gamma_M$, the relationship between the motion of base 9 and the dither motion can be approximated by the following equation:

$$\theta_B = X \cdot \theta_D + Y \cdot \omega_D \tag{7}$$

In equation 7, both X and Y are to be determined.

Replacing $\theta_B$ in equation 6 with $X\theta_D + Y\omega_D$ in equation 7, and setting $\alpha_D = -\gamma_M^2 \cdot \theta_D$ yields the following equation:

$$f_\phi(X \cdot \omega_D - \gamma_M^2 \cdot Y \cdot \theta_D) + K_\phi(X \cdot \theta_D + Y \cdot \omega_D) = \gamma_M^2(J_G\theta_D + (J_B + J_G)(X \cdot \theta_D + Y \cdot \omega_D))$$

Collecting the terms in $\theta_D$ and in $\omega_D$ yields the following equation:

$$\theta_D(\gamma_M^2(J_G + X(J_B + J_G)) + f_\phi \cdot Y) - K_\phi \cdot X) + \omega_D(\gamma_M^2 \cdot Y(J_B + J_G) - f_\phi \cdot X - K_\phi \cdot Y) = 0$$

Since $\theta_D$ is represented by a sine function and $\omega_D$ is represented by a cosine function, these are both mutually "orthogonal," and therefore the coefficients of both $\theta_D$ and $\omega_D$ must equal zero. Setting the coefficients of both $\theta_D$ and $\omega_D$ equal to zero yields the following equations:

$$Y = \frac{f_\phi \cdot X}{Z} \tag{10}$$

$$X = \frac{-(Z \cdot \gamma_M^2 J_G)}{Z^2 + (\gamma_M f_\phi)^2} \tag{11}$$

In equations 10 and 11, $Z = \gamma_M^2 \cdot (J_B + J_G) - f_\phi$.

Rearranging equation 4 and replacing $\alpha_G$ in equation 4 with $\alpha_D + \alpha_B$ and replacing $\omega_G - \omega_B$ with $\omega_D$ and also replacing $\theta_G - \theta_B$ with $\theta_D$ yields the following equations:

$$T = J_G(\alpha_D + \alpha_B) + f_{RB}\omega_D + K_{RB}\theta_D \tag{12}$$

$$T = K_{RB}\theta_D + f_{RB}\omega_D - \gamma_M^2 J_G(\theta_D + X\theta_D + Y\omega_D) \quad (13)$$

Assuming that the dither drive forcing function, T, is configured to be some multiple of $\omega_D$ so that the ring laser gyro dithers at its natural frequency, without the drive trying to "pull" or "push" the dither phase, then equating the coefficient of $\theta_D$ to zero yields the following equation:

$$K_{RB} - \gamma_M^2 J_G(1+X) = 0$$

$$\gamma_M^2 = \frac{K_{RB}}{J_G(1+X)} \quad 15$$

For the "free body" case, $f_\phi$ and $K_\phi$ are both equal to zero. In this case, X and Y have special values indicated in equation 16:

$$X_\phi = \frac{-J_G}{J_B + J_G} \quad 16$$

$$Y_\phi = 0$$

Substituting the expressions for X and Y from equation 16 into equation 7 yields the following equation:

$$\theta_B = \theta_D \frac{-J_G}{J_B + J_G} \quad 17$$

Equation 17 represents the relationship between the base motion $\theta_B$ and the dither motion $\theta_D$ for the situation where the base acts as a free body. Equation 17 forms the basis for having the base motion approximated by the dither motion multiplied or scaled by the ratio of the inertia of sensor block 12 over the sum of the inertias of sensor block 12 and the base 9. The inertia ratio, $$\frac{J_G}{J_B + J_G},$$

in equation 17 is used by the closed loop feedback system 110 shown in FIG. 2 to obtain an estimation of the base motion due to dithering. More specifically, multiplying means 106 adjusts the gain of the corrected pick-off signal $\theta_{CP}$ by the scaling factor $$\frac{J_G}{J_B + J_G}$$

to obtain an estimation of the base component of the dither motion represented by signal $\theta_C$.

An alternative basis for the approximation of the base motion by of the rotational inertia ratio $$\frac{J_G}{J_B + J_G}$$

is based on conservation of angular momentum principles. The gyro assembly 119 can be analyzed as a free body for dither frequencies that are of an order of magnitude greater than the natural frequency of the low frequency base mount represented by spring 122 and dashpot 121 in FIG. 5. Therefore, it can be assumed that there are no outside forces acting on the gyro assembly 119. Because no outside forces are acting on gyro assembly 119, the angular momentum will be conserved as represented by the following equation:

$$J_G\omega_G + J_B\omega_B = 0 \quad (18)$$

In this equation, $J_G$ and $J_B$ represent the rotational moment of inertia for the sensor block and base, respectively. The terms $\omega_G$ and $\omega_B$ represent the angular velocity of the sensor and base, respectively. The terms $J_R\omega_G$ and $J_B\omega_B$ represent the angular momentum of the sensor and base, respectively.

The frequency of vibration of each body is identical; therefore, the period of motion represented by the term P is identical. The period of motion for the sensor and base is represented by the following equation:

$$P = 2\pi \sqrt{\frac{J_G}{K_\phi}} = 2\pi \sqrt{\frac{J_B}{K_{RB}}} \quad 19$$

In this equation, the terms $K_\phi$ represents the rotational stiffness of the spring 122 connected between the case 120 and base 9. The term $K_{RB}$ represents the rotational stiffness of the spring 128 connected between the base 9 and sensor block 12.

If it is assumed that the gyro system 119 does not have any rotational friction and the springs are lossless, then energy is conserved. The maximum stored kinetic energy for both base 9 and sensor block 12 is equal to the maximum potential energy for both the base 9 and sensor block 12, as represented by equations 20 and 21:

$$\frac{1}{2} J_G \omega_{maxG}^2 = \frac{1}{2} K_{RB}\theta_G^2 \quad 20$$

$$\frac{1}{2} J_B \omega_{maxB}^2 = \frac{1}{2} K_\phi \theta_B^2 \quad 21$$

In equations 20 and 21, the terms $\omega_{maxG}$ and $\omega_{maxB}$ represent the maximum angular velocity of the sensor and the base, respectively. Solving equation for $\omega_G$ yields the following equation:

$$\omega_G = \sqrt{\frac{K_{RB}}{J_G}} \theta_G \quad 22$$

Solving equation 21 for $\omega_B$ yields the following equation:

$$\omega_B = \sqrt{\frac{K_\phi}{J_B}} \theta_B \quad 23$$

Solving equations 22 and 23 for $\sqrt{\frac{K_{RB}}{J_G}}$ and $\sqrt{\frac{K_\theta}{J_B}}$, respectively, and setting $$\frac{\omega_B}{\theta_B}$$

equal to $$\frac{\omega_G}{\theta_G},$$

from equation 19, thereby yielding the following equation:

$$\frac{\omega_G}{\omega_B} = \frac{\theta_G}{\theta_B} \qquad 24$$

Replacing $\omega_B$ in equation 18 with $$\omega_G \frac{\theta_B}{\theta_G} \qquad 25$$

from equation 24 yields the following equation:

$$J_G \omega_G + J_B \omega_G \frac{\theta_B}{\theta_G} = 0 \qquad 25$$

After subtracting the term $J_B \omega_G$ from both sides of equation 25 and multiplying both sides by $$\frac{\theta_G}{\omega_G}$$

the term $J_B \theta_B$ can be subtracted from both sides to yield the following equation:

$$J_G \theta_G + J_B \theta_B = 0 \qquad (26)$$

Because the dither pickoff angle $\theta_D$ represents the relative angular displacement between sensor block 12 and base 9, this angle can be represented by the following equation: $\theta_D = \theta_G - \theta_B$. The term $\theta_D$ represents the difference between the angular displacement of the sensor $\theta_G$ and base $\theta_B$. Subtracting $J_G \theta_G$ from both sides of equation 26, replacing the term $\theta_G$ with the term $\theta_D + \theta_B$, and combining the terms yields the following expression:

$$\theta_B = \theta_D \frac{-J_G}{J_B + J_G} \qquad 27$$

Equation 27 is identical to Equation 17 and represents the relationship between the base motion and the dither motion for dither frequencies sufficiently above the natural frequency of the base shock mounting so that the base acts like a free body.

Referring to Table 1, there is shown by way of example a table illustrating the operation of the closed loop feedback system shown in FIG. 2. As seen in Table 1 the operation of the closed loop feedback system causes the corrected output signal $\theta_{CS}$ to converge to a value representative of the actual base motion component $\theta_B$ of the dither signal. Table 1 represents the values computed for each of the operations illustrated in FIG. 2 over a number of discrete time intervals.

TABLE 1

| Time | Gyro Angle | Pickoff Reading | Pickoff Gain | Corrected Pickoff | Computed Base Motion | Stripped Output | Error Signal | Gain Change |
|---|---|---|---|---|---|---|---|---|
| 0 | 500 | 400 | 1.000 | 400.0 | −36.36 | 100.0 | 136.36 | .136 |
| 1 | 500 | 400 | 1.136 | 454.4 | −41.30 | 45.6 | 86.90 | .087 |
| 2 | 500 | 400 | 1.123 | 489.2 | −44.47 | 10.8 | 55.27 | .055 |
| 3 | 500 | 400 | 1.278 | 511.2 | −46.47 | −11.2 | 35.27 | .035 |
| 4 | 500 | 400 | 1.313 | 525.2 | −47.74 | −25.2 | 22.54 | .022 |
| 5 | 500 | 400 | 1.336 | 534.4 | −48.58 | −34.4 | 14.28 | .014 |
| 6 | 500 | 400 | 1.350 | 540.0 | −49.09 | −40.0 | 9.09 | .009 |
| 7 | 500 | 400 | 1.359 | 543.6 | −49.41 | −43.6 | 5.81 | .006 |
| 8 | 500 | 400 | 1.365 | 546.0 | −49.63 | −46.0 | 3.63 | .004 |
| 9 | 500 | 400 | 1.369 | 547.6 | −49.78 | −47.6 | 2.18 | .002 |
| 10 | 500 | 400 | 1.371 | 548.4 | −49.85 | −48.4 | 1.45 | .001 |
| 11 | 500 | 400 | 1.372 | 548.8 | −49.89 | −48.8 | 1.09 | .001 |
| 12 | 500 | 400 | 1.373 | 549.2 | −49.92 | −49.2 | .72 | .001 |
| 13 | 500 | 400 | 1.374 | 549.6 | −49.96 | −49.6 | .36 | .0004 |
| 14 | 500 | 400 | 1.374 | 549.6 | −49.96 | −49.6 | .36 | .0004 |
| 15 | 500 | 400 | 1.375 | 550.0 | −50.0 | −50.0 | 0 | 0 |

The first column shown in Table 1, labeled "Time," represents sequential time intervals for each calculation. In a typical system, the gains would be such that each time interval represents a range of 1 to 10 seconds. The time interval may be variable. For instance, when the system is initially turned on, the time interval may be shorter to allow the corrected output signal to converge on the actual base motion in a shorter period of time. After the corrected output signal has reached the actual base motion, the time interval may then be increased.

The column labeled "Gyro Angle" is the inertial angle measured by the gyro or sensor 10. In this example, the gyro angle is 500 arc seconds. This gyro angle is precisely measured by the gyro and is assumed without error. The column labeled "Pickoff Reading" represents the dither pickoff signal 19 which has been converted to a digital value by A/D converter 105. Because the sensor reading the pickoff signal 19 is not calibrated, this pickoff reading does not represent the actual magnitude of the relative angular rotation between sensor block 12 and base 9. In this example, the pickoff reading is 400 arc seconds while the actual relative angular rotation between sensor block 12 and base 9 is 550 arc seconds.

The column labeled "Pickoff Gain" represents the gain setting for gain means 104 for each time interval resulting from the feedback loop action. Gain means 104 has an initial gain of some value. In this example, the initial gain is 1.00. The gain of gain means 104 is corrected each time interval based on the error signal $\theta_E$ for that time interval. In this example, the error is multiplied by 0.001 and the result is added to the gain value. Thus, gain means 105 acts as an integrator. The column labeled "Corrected Pickoff" represents the pickoff value provided by A/D converter 105 multiplied by the gain of gain means 104. The corrected pickoff value $\theta_{CP}$ represents the relative rotation angle between sensor block 12 and base 9. Once the closed loop system has converged, i.e. the dither component of corrected output signal $\theta_{CS}$ is equal to the base motion $\theta_B$, the corrected pickoff signal $\theta_{CP}$ will be gain adjusted to be equal to the dither signal in the sensor output signal $\theta_S$.

The column labeled "Computed Base Motion" represents the corrected pickoff value multiplied by the ratio of the rotational inertia of sensor block 12 over the sum of the rotational inertia of sensor block 12 and the rotational inertia of base 9. This ratio of inertia is known for each gyro system and, in this example, this ratio is equal to 0.0909, i.e. the base inertia is chosen 10 times greater than the gyro or sensor inertia. The multiplication means 106 performs the ratio multiplication of the corrected pickoff signal $\theta_{CP}$ to obtain the computed base motion $\theta_C$. The column labeled "Stripped Output" is the difference between the gyro output signal $\theta_S$ and the corrected pickoff signal $\theta_{CP}$. The stripped output signal $\theta_{CS}$ represents the actual base motion $\theta_B$ once the closed loop system reaches convergence.

The column labeled "Error Signal" is the difference between the stripped output signal $\theta_{CS}$ and the computed base motion $\theta_C$. When the error signal $\theta_E$ is positive, the computed base motion is too small and the gain of gain means 104 is incremented. The column entitled "Gain Change" represents the amount either added or subtracted from the current value of the gain for gain means 104. The current gain value of gain means 104 is adjusted or changed in order to drive the error signal $\theta_E$ toward zero. The error signal $\theta_E$ will be equal to zero when the closed loop system has reached convergence. The current gain value of gain means 104 is the sum of the initial gain value plus all of the gain corrections made as a result of the error signal $\theta_E$. Gain means 104 is adjusted or corrected at each corresponding time interval.

In operation, processing means 110 at periodic intervals receives a digital value from pulse accumulator 100 representing the angular rotation of sensor 10 at that instant. In addition, processor 110 at that same interval receives a digital value of dither pickoff signal 19 representing the actual dither motion of sensor 10. Processing means 110 at each interval samples both the sensor output signal $\theta_S$ and the dither pickoff signal 19, subtracts these sampled values from the previous values of these signals and uses these differences to update the gain of gain means 104. Note that since the gyro reading is the integral of the input rate this processing is actually performed by taking the differences between the present values of $\theta_D$ and $\theta_G$ and the previous value of these terms. This effectively gets rid of the large accumulated angle in the gyro output otherwise present. The processor periodically updates or adjusts the gain of gain means 104 so as to eliminate the dither component in the output $\theta_{CS}$ while at the same time subtracts a newly computed base motion value which is subtracted therefrom. After a number of time intervals, the gain of gain means 104 is set such that the corrected pickoff signal $\theta_{CP}$, when subtracted from sensor output $\theta_S$, produces the base motion component of the dither signal or base dither angle $\theta_{CS}$.

The present invention provides an apparatus for substantially removing the sensor motion component $\theta_G$ due to dithering of the sensor from the sensor output signal $\theta_S$ while leaving the base motion component $\theta_B$ due to the reactive dithering of the base substantially intact. Once the base motion component due to dithering is obtained, it may be used in a variety of ways to compensate for errors produced by this base motion. For example, the present invention provides the dither induced base motion contribution of each individual inertial integrating rate sensor mounted on a base. Therefore, the present invention provides the base motion contribution for each individual inertial integrating rate sensor for applications using more than one sensor mounted to the block. The coning error for each inertial integrating rate sensor on a block can be calculated because the base motion contributions of each individual inertial integrating rate sensor on that block are known. Once the coning error is computed, this error can then be compensated for by the navigation system.

As a further example, the present invention may be used in applications where a single inertial integrating rate sensor is mounted on a base such as a precision pointing device application. In this case, the present invention provides the dither induced base motion. This base motion information can then be used in the system analysis to compensate for any errors caused by this motion. In this manner, the precision pointing device achieves greater accuracy.

The present invention may be implemented in a variety of ways. For example, a filter means may be used to separate the inertial component from the dither component of the sensor output signal $\theta_S$. Because the dither component of the output signal has a known frequency and phase, i.e. the frequency and phase of the input dither signal, then the dither component of the output signal can be removed by using either a bandpass filter having a center frequency at the dither frequency or a phase sensitive filter. The dither component of the readout signal can then be supplied to a scaling or multiplying means for multiplying this dither signal by the factor $$\frac{J_G}{J_B + J_G}.$$

The signal produced by this multiplier will then be an estimated representation of dither induced base motion.

The present invention provides a means for estimating or computing the base motion components due to dither for each individual inertial integrating rate sensor. The feedback loop or closed loop system of the present invention makes use of the piezoelectric crystal output referred to as the dither pickoff signal directly without requiring calibration techniques to compensate for age, temperature and various environmental factors which cause this piezoelectric output to drift or vary over time.

Although the present invention has been described with reference to preferred embodiments, workers skilled in the art will recognize that changes may be made in form and detail without departing from the spirit and scope of the invention.

What is claimed is:

1. An angular rotation sensing system for sensing rotational motion about a primary axis with respect to a base compliantly mountable to a supporting means, said angular rotation sensing system capable of providing a sensing system output signal indicative of angular rotation, said sensing system comprising:

an angular motion sensor capable of providing a sensor output signal indicative of angular rotation about a primary axis;

angular motion sensor mounting means for mounting said angular motion sensor to said base having compliance so that said angular motion sensor can be rotationally oscillated;

an oscillation means capable of producing a first torque acting on said angular motion sensor with respect to said base resulting in a second torque on said angular motion sensor acting in a direction opposite said first torque causing both said angular motion sensor and said base to rotationally oscillate, said sensor output signal indicative of angular rotation having an inertial component due to any inertial rotation of said angular motion sensor about said primary axis and an oscillation component due to said rotational oscillation of said angular motion sensor, said oscillation component further includes a base motion contribution and an angular motion sensor motion contribution;

an estimation means for providing an estimated value of said base motion contribution; and stripping means for determining said angular motion sensor contribution from both said oscillation component and said estimated value, said stripping means providing said sensing system output signal with said base motion contribution therein having removed said angular motion sensor motion contribution.

2. The angular rotation sensing system of claim 1 wherein said estimation means further includes:

sensing means for providing an oscillation motion signal that is substantially the same as said angular motion sensor motion contribution; and scaling means, capable of receiving said oscillation motion signal as an input signal from said sensing means, for providing a scaled output signal that is substantially the same as said base motion contribution with said angular motion sensor motion contribution being substantially absent.

3. The angular rotation sensing system of claim 2 wherein said sensing means further includes:

means for providing a pickoff signal representative of relative motion between said angular motion sensor and said base; and variable gain amplifying means having an input signal and an output signal with said input signal being said pickoff signal and said output signal being capable of being substantially the same as said base motion contribution, said variable gain amplifying means having a gain determined by a gain control signal provided by a gain control means.

4. The angular rotation sensing system of claim 3 wherein said means for providing said pickoff signal representative of relative motion between said angular motion sensor and said base is a piezoelectric device.

5. The angular rotation sensing system of claim 3 wherein said gain control means further includes a synchronous demodulator capable of receiving said pickoff signal and an error signal representative of said angular motion sensor motion contribution, said synchronous demodulator capable of providing said gain control signal that is representative of signal components in said error signal that are synchronous with those components of said pickoff signal.

6. The angular rotation sensing system of claim 2 wherein said scaling means is an amplifying means capable of producing said scaled output signal that is substantially the same as said input signal scaled by a ratio of a rotational inertia of said angular motion sensor to a sum of said rotational inertia of said angular motion sensor and a rotational inertia of said base.

7. The angular rotation sensing system of claim 1 wherein said estimation means further includes a multiplying means for multiplying said angular motion sensor motion contribution by a fixed ratio to provide said base motion contribution.

8. The angular rotation sensing system of claim 7 wherein said fixed ratio is equal to a rotational inertia of said angular motion sensor to a sum of said rotational inertia of said angular motion sensor and a rotational inertia of said base.

9. The angular rotation sensing system of claim 1 wherein said angular rotation sensing system further comprises a plurality of angular motion sensors and with said sensing system output signal including said base motion contribution from each of said plurality with said angular motion sensor motion contribution from each of said plurality being substantially absent.

10. The angular rotation sensing system of claim 9 wherein each of said plurality of angular motion sensors has a primary axis, and with each of said primary axes together forming a plurality of primary axes that are substantially mutually orthogonal to one another.

11. The angular rotation sensing system of claim 1 wherein said angular motion sensor is an inertial integrating rate sensor.

12. An angular rotation sensing system for sensing rotational motion about a primary axis with respect to a base compliantly mountable to a support means, said sensing system capable of providing a sensing system output signal indicative of angular rotation, said sensing system comprising:

an angular motion sensor capable of providing a sensor output signal indicative of angular rotation about a primary axis;

angular motion sensor mounting means for mounting said angular motion sensor to said base having compliance so that said angular motion sensor can be rotationally oscillated;

an oscillation means capable of producing a first torque acting on said angular motion sensor with respect to said base resulting in a second torque on said angular motion sensor acting in a direction opposite said first torque causing both said angular motion sensor and said base to rotationally oscillate, said sensor output signal indicative of angular rotation having an inertial component due to any inertial rotation of said angular motion sensor about said primary axis and an oscillation component due to said rotational oscillation of said angular motion sensor, said oscillation component further includes a base motion contribution and an angular motion sensor motion contribution;

a first signal combining means for removing said angular motion sensor motion contribution from said sensor output signal thereby providing said sensing system output signal having said inertial component and said base motion contribution with said angular motion sensor motion contribution being substantially absent;

a second signal combining means for removing an estimated base motion contribution from said sensing system output signal thereby providing an error signal;

a demodulating means for receiving both said error signal and a pickoff signal representative of relative motion between said sensor and said base, said demodulating means capable of providing a gain control signal that is representative of components of said error signal that are present in said pickoff signal;

an amplifying means capable of receiving said pickoff signal and providing an amplified output signal having a gain determined by said gain control signal, said amplified output signal being representative of said angular motion sensor motion contribution and being provided to both said first signal combining means and a multiplier means; and multiplier means for multiplying said amplified output signal representing said angular motion sensor motion contribution by a ratio of a rotational inertia of said angular motion sensor to a sum of said rotational inertia of said angular motion sensor and a rotational inertia of said base thereby forming said estimated base motion contribution that is provided to said second signal combining means.

13. The angular rotation sensing system of claim 12 wherein said angular rotation sensing system further comprises a plurality of angular motion sensors and with said sensing system output signal including said base motion contribution from each of said plurality with said angular motion sensor motion contribution from each of said plurality being substantially absent.

14. The angular rotation sensing system of claim 12 wherein each of said plurality of angular motion sensors has a primary axis, and with each of said primary axes together forming a plurality of primary axes that are substantially mutually orthogonal to one another.

15. The angular rotation sensing system of claim 12 wherein said angular motion sensor is an inertial integrating rate sensor.

16. A method for detecting angular rotation presented to an angular rotation sensing system about a primary axis with respect to a base and compliantly mountable to a supporting means, said angular rotation sensing system capable of providing a sensing system output signal indicative of angular rotation, said method comprising:

oscillating rotationally said angular motion sensor with an oscillation means to produce a first torque acting on said angular motion sensor with respect to said base resulting in a second torque on said angular motion sensor acting in a direction opposite said first torque causing both said base and said angular motion sensor to rotationally oscillate;

producing a sensor output signal indicative of angular rotation about a primary axis with said angular motion sensor, said sensor output signal having an inertial component due to any inertial rotation of said angular motion sensor and an oscillation component due to rotational oscillation of said angular motion sensor by said oscillation means, said oscillation component further includes a base motion contribution and a sensor motion contribution;

estimating a value of said base motion contribution with an estimation means; and determining said angular motion sensor motion contribution from both said oscillation component and said estimated value with a stripping means to provide said sensing system output signal with said base motion contribution therein having removed said angular motion sensor motion contribution.

* * * * *